Nov. 10, 1931.  F. J. THIER  1,831,329
BEET BLOCKER AND CULTIVATOR
Filed Dec. 30, 1929
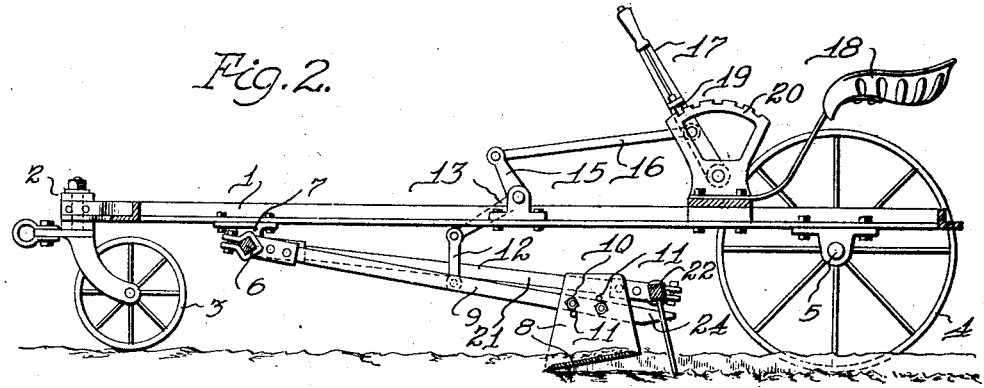
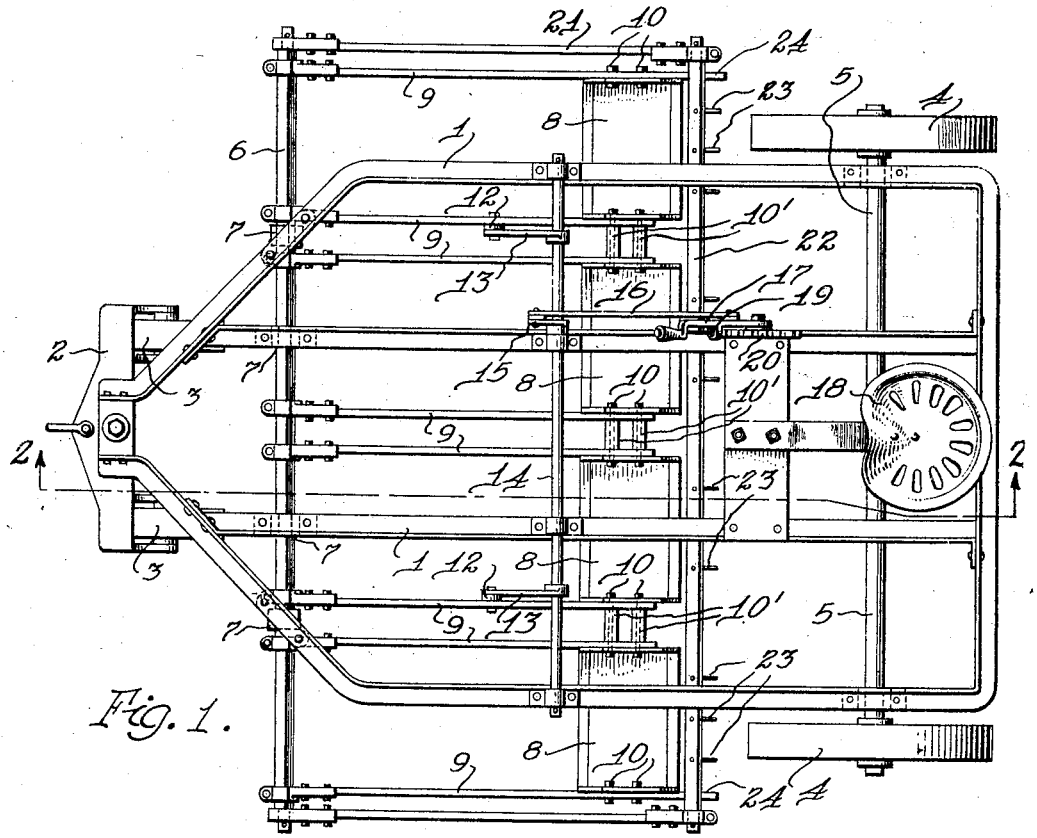
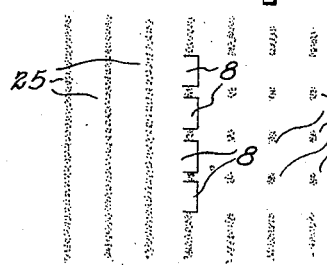
INVENTOR
Frederick J. Thier,
BY
ATTORNEYS Patented Nov. 10, 1931

1,831,329

UNITED STATES PATENT OFFICE

FREDERICK J. THIER, OF DETROIT, MICHIGAN

BEET BLOCKER AND CULTIVATOR

Application filed December 30, 1929. Serial No. 417,363.

My invention relates to a type or class of wheeled cultivators known as weed cutters or vegetable blockers and consists in the improved construction, arrangement, and combination of parts herein illustrated, described, and particularly pointed out in the appended claims, my objective being the production of an adjustable, easily manipulated garden tool of simple yet rugged durable construction and of high operative efficiency.

Constructive and operative simplicity is evidenced by the selective control mechanism, a hand-lever setting or tripping device being provided for manipulation of the cutters and rake while the cultivator is moving or in use. Both the depth at which the cutting edge of the weeding hoes is set and its angular relation to the ground can be changed at will while the cultivator is moving without affecting the positional disposition of the hoes to vary the width of cutting done.

Such a device is particularly useful not only in loosening the soil between rows of growing vegetables or plants and destroying weeds by cutting them down at their roots, but in "blocking" the rows by running the cultivator across them so as to leave plants standing in equally spaced "hills".

Of the accompanying drawings, in which the same reference numerals apply to like parts, Figure 1 is a top or plan view, Fig. 2 is a sectional elevation along lines 2—2 of Figure 1, and Fig. 3 is a diagrammatic view illustrating the manner in which the present device is operated transversely to the direction of the rows of seeds.

To the forward part of the frame 1 is pivotally attached a crosswise member 2 that serves to arch the space or opening between a pair of upholding guide wheels 3 cooperating with wheels 4 mounted on the axle 5 to support the frame and the cutting hoes and rakes which are adjustably attached thereto. A squared or angular shaft 6 is mounted in bearings 7 bolted to the frame 1, the shaft having rounded portions to accommodate the bearings which support it to extend crosswise of the frame.

Hoes 8, having double cutting edges are secured to elongated arms 9 which are mounted on the squared portion of the shaft 6, any desired number of hoes being accommodated thereby in spaced relation substantially as illustrated in Fig. 1 of the drawings. The hoes are secured to the arms 9 by bolts 10 which pass through openings 11 in the hoe and therefore by selecting different holes the angularity of the hoes may be changed relative to the arms or the hoe may be reversed, this latter being found a desirable feature when the present machine is in use and the hoes become dull for the hoeing operation does not have to stop until the hoes are resharpened. The bolts 10, as clearly illustrated pass through bushings 10' between the several hoes so that the latter are all joined together to move as one.

The depth at which the hoes cut into the soil may also be changed, provision for the depth adjustment being made by connecting certain of the arms 9 by means of links 12 to arms 13 which are non-rotatably secured on the shaft 14 which in turn is rotatably mounted upon the frame 1. The shaft 14 is further provided with an upwardly extending fixed arm 15 which is connected by the rod 16 to a hand lever 17 mounted upon the frame 1 adjacent the operator's seat 18 and having a dog mechanism 19 to engage the segment 20 whereby the lever may be maintained in any position of adjustment according to the size of the segment.

The adjustment of the hoes is made by swinging the lever 17, pulling the lever backwardly causing the shaft 14 to rotate as a result of the connection provided by the rod 16 and the arm 15. Rotation of the shaft 14 causes movement of the arms 13, upwardly or downwardly according to the direction of rotation of the shaft and the links 12 which are connected to the ends of these arms 13 and to the hoe supporting arms 9 cause the hoes to be moved in a corresponding direction.

Rakes are provided to smooth the ground surface after the hoes have cut into it and are supported by means of the arms 21 which are mounted upon the ends of the shaft 6 which is provided with a circular portion to accommodate the same. The two arms are connected at their extremities by the metal rod 22 upon which the tines 23 are mounted directly behind the several hoes and this construction provides a rake which is pivotally mounted so that its own weight provides the necessary pressure upon the soil.

To raise the rake out of engagement with the ground the outside hoe supporting arms 9 are provided with extensions as at 24 which engage under the rod 22 so that the rakes are raised when the hoes are raised.

In the diagram indicated in the drawings as Fig. 3 the hoes 8 are indicated as being passed in a transverse direction across the rows 25 of seeds or sprouting plants showing the manner in which small tufts or hills 26 of plants remain. In this manner the plants are thinned out and permitted to absorb the required amount of nourishment from the soil and they are not stunted in growth as a result of over-crowding.

Although a specific embodiment of the present invention has been illustrated and described it is to be understood that various alterations may be made in the details of construction without departing from the spirit of the invention and such changes are contemplated.

What I claim is:

1. A cultivator comprising a wheeled frame, an angular shaft rotatably mounted in said frame, a plurality of spaced arms mounted on said shaft to rotate therewith, hoes mounted between pairs of said arms, means for securing all of said hoes together whereby they move as a unit, certain of said arms projecting beyond the rear edges of said hoes, a pair of arms having their ends rotatably mounted on the outer extremities of said shaft, a cross rod joining said last named arms, tines mounted in said rod, and means for raising and lowering said hoes, upward movement of said hoes causing said projecting arms to engage said cross rod and cause the same to be raised.

2. A cultivator comprising a wheeled frame, a shaft mounted adjacent the forward end of said frame, arms secured at one end to said shaft and having hoes mounted upon their opposite ends, means for securing all of said hoes together, a rake supported behind said hoes by arms having their ends freely mounted upon said shaft, and projections formed on certain of said hoe supporting arms to extend outwardly behind said hoes whereby upward movement of said hoes brings said projections into contact with said rake, and means mounted on said frame for raising said hoes.

3. A cultivator comprising a wheeled frame, a plurality of hoes united together, arms pivotally attached to said frame for supporting said hoes, a rake, arms pivotally attached to said frame for supporting said rake whereby it projects to the rear of said hoes, and members projecting to the rear of said hoes for engaging said rake for the purpose of raising the same when said hoes are raised, and means on said frame for raising said hoes.

4. A cultivator comprising a wheeled frame, an angular shaft rotatably mounted in said frame, a plurality of spaced arms mounted on said shaft to rotate therewith, hoes mounted between pairs of said arms, means for securing all of said hoes together whereby they move as a unit, certain of said arms projecting beyond the rear edges of said hoes, a pair of arms having their ends rotatably mounted on the outer extremities of said shaft, a cross rod joining said last named arms, tines mounted in said rod, and means for raising and lowering said hoes, upward movement of said hoes causing said projecting arms to engage said cross rod and cause the same to be raised, said means comprising a rotatable shaft, fixed arms mounted on said shaft and connected by links to said hoe supporting arms, a fixed arm mounted upon said shaft and connected by a rod to an operating hand lever, and a dog and ratchet mechanism for holding said hand lever in any position of adjustment.

5. A cultivator comprising a wheeled frame, a shaft mounted adjacent the forward end of said frame, arms secured at one end to said shaft and having hoes mounted upon their opposite ends, means for securing all of said hoes together, a rake supported behind said hoes by arms having their ends freely mounted upon said shaft, and projections formed on certain of said hoe supporting arms to extend outwardly behind said hoes whereby upward movement of said hoes brings said projections into contact with said rake, means mounted on said frame for raising said hoes, said means comprising a rotatable shaft, fixed arms mounted on said shaft and connected by links to said hoe supporting arms, a fixed arm mounted upon said shaft and connected by a rod to an operating hand lever, and a dog and ratchet mechanism for holding said hand lever in any position of adjustment.

6. A cultivator comprising a wheeled frame, a plurality of hoes united together, arms pivotally attached to said frame for supporting said hoes, a rake, arms pivotally attached to said frame for supporting said rake whereby it projects to the rear of said hoes, and members projecting to the rear of said hoes for engaging said rake for the purpose of raising the same when said hoes are raised, and means on said frame for raising said hoes, said means comprising a rotatable shaft, fixed arms mounted on said shaft and connected by links to said hoe supporting arms, a fixed arm mounted upon said shaft and connected by a rod to an operating hand lever, and a dog and ratchet mechanism for holding said hand lever in any position of adjustment.

In testimony whereof I affix my signature.

FREDERICK J. THIER.